(12) United States Patent
Backhaus

(10) Patent No.: US 10,233,808 B2
(45) Date of Patent: Mar. 19, 2019

(54) USE OF SPECIFIC ENGINE CYLINDERS FOR REDUCTANT GENERATION

(71) Applicant: Cummins Emission Solutions Inc., Columbus, IN (US)

(72) Inventor: Jacob Backhaus, Stoughton, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 220 days.

(21) Appl. No.: 14/958,558

(22) Filed: Dec. 3, 2015

(65) Prior Publication Data

US 2017/0159525 A1 Jun. 8, 2017

(51) Int. Cl.
*F01N 3/20* (2006.01)
*F02D 35/02* (2006.01)
*F02D 41/00* (2006.01)

(52) U.S. Cl.
CPC ......... *F01N 3/2053* (2013.01); *F01N 3/2066* (2013.01); *F01N 3/2073* (2013.01); *F02D 35/028* (2013.01); *F01N 2430/06* (2013.01); *F01N 2570/14* (2013.01); *F01N 2610/02* (2013.01); *F02D 41/0082* (2013.01); *Y02T 10/24* (2013.01)

(58) Field of Classification Search
CPC .. F01N 2240/25; F01N 13/011; F01N 3/2073; F02D 41/0082
See application file for complete search history.

(56) References Cited

U.S. PATENT DOCUMENTS

| | | | |
|---|---|---|---|
| 5,778,667 A | 7/1998 | Kinugasa et al. | |
| 5,974,793 A | 11/1999 | Kinugasa et al. | |
| 6,047,542 A * | 4/2000 | Kinugasa | B01D 53/8696 123/443 |
| 6,453,854 B1 | 9/2002 | Baeuerle et al. | |
| 8,539,760 B2 * | 9/2013 | Li | B01D 53/9422 422/171 |
| 8,893,687 B2 | 11/2014 | Gingrich et al. | |
| 8,899,016 B2 | 12/2014 | Gingrich et al. | |
| 8,931,257 B2 | 1/2015 | Narayanaswamy et al. | |
| 2005/0229900 A1 * | 10/2005 | Weber | F01N 3/103 123/316 |
| 2006/0266021 A1 | 11/2006 | Robel et al. | |

(Continued)

FOREIGN PATENT DOCUMENTS

JP 04365920 A * 12/1992

OTHER PUBLICATIONS

Machine English translation of JP04-365920A.*

(Continued)

*Primary Examiner* — Patrick Maines

(74) *Attorney, Agent, or Firm* — Foley & Lardner LLP

(57) ABSTRACT

A system comprises an engine including a plurality of cylinders. A first intake throttle is positioned upstream of a first set of cylinders of the plurality of cylinders. The first intake throttle provides air at a first flow rate to the first set of cylinders so as to produce a lean air/fuel mixture in the first set of cylinders. A second intake throttle is positioned upstream of a second set of cylinders included in the plurality of cylinders and in parallel of the first intake throttle. The second intake throttle provides air at a second flow rate to the second set of cylinders so as to produce a rich air/fuel mixture in the second set of cylinders.

26 Claims, 7 Drawing Sheets

(56) References Cited

U.S. PATENT DOCUMENTS

| | | |
|---|---|---|
| 2009/0249770 A1 | 10/2009 | Ogiso |
| 2009/0282807 A1 | 11/2009 | Rioli et al. |
| 2012/0023935 A1 | 2/2012 | Pursifull et al. |
| 2012/0204844 A1* | 8/2012 | Gingrich ............ F02B 27/0215 123/568.11 |
| 2012/0204845 A1* | 8/2012 | Gingrich ................ F02M 26/43 123/568.17 |
| 2013/0220286 A1* | 8/2013 | Gingrich ............ F02D 41/0065 123/568.11 |
| 2013/0340727 A1 | 12/2013 | Keating |
| 2014/0142833 A1* | 5/2014 | Gingrich ............ F02D 41/0255 701/103 |
| 2015/0122225 A1* | 5/2015 | Kamada ............ F02D 41/1446 123/48 R |
| 2015/0337696 A1 | 11/2015 | Glugla et al. |
| 2016/0025021 A1* | 1/2016 | Hilditch ................ F02M 26/16 60/274 |
| 2016/0131056 A1* | 5/2016 | Henry ................ F02D 41/0082 60/274 |
| 2016/0230632 A1* | 8/2016 | Smith .................... F01N 3/2073 |
| 2016/0252027 A1* | 9/2016 | Jackson ............ F02D 41/0027 60/605.2 |
| 2017/0241364 A1* | 8/2017 | Sczomak ............... F02M 26/15 |

OTHER PUBLICATIONS

International Search Report and Written Opinion issued for PCT Application No. PCT/U.S.2016/063145, dated Feb. 6, 2017, 11 pages.

\* cited by examiner

USE OF SPECIFIC ENGINE CYLINDERS FOR REDUCTANT GENERATION

TECHNICAL FIELD

The present disclosure relates generally to systems and methods of operating internal combustion (IC) engines and aftertreatment systems for use with IC engines.

BACKGROUND

Exhaust aftertreatment systems are used to receive and treat exhaust gas generated by IC engines. Exhaust gases produced by IC engines operating on fuels such as gasoline, diesel, liquefied petroleum gas (LPG), ethanol, natural gas and/or dual fuel variants include NOx gases, carbon monoxide (CO) and/or unburnt hydrocarbons which have to be neutralized before the exhaust gas is expelled into the environment. Aftertreatment systems employed for treating the exhaust gas produced by such IC engines operating under stoichiometric conditions often include a three way catalyst configured to efficiently decompose NOx gases, CO and unburnt hydrocarbons included in the exhaust gas. However, engines that operate lean cannot effectively decompose NOx gases with a three-way catalyst. A selective catalytic reduction (SCR) device, typically in conjunction with a reductant (e.g., urea-water solution (UWS)) injection system is generally used to efficiently decompose NOx emissions in a lean environment.

Three-way catalysts are effective when the engine is operated within a narrow band of air to fuel (air/fuel) ratios near the stoichiometric point, such that the exhaust gas composition oscillates between rich (excess fuel) and lean (excess oxygen) conditions. Conversion efficiency falls very rapidly when the engine is operated outside of this band. Under lean engine operation, the exhaust gas contains excess oxygen, and the reduction of NOx is not favored. Under rich conditions, the excess fuel consumes all of the available oxygen prior to the catalyst, resulting in poor reduction of CO and unburned hydrocarbons and the formation of ammonia from NOx. From a fuel efficiency perspective, it is beneficial to operate the engine under lean conditions to minimize fuel consumption and maximize fuel efficiency. However, the limitation posed by the three way catalyst for operating within the narrow air to fuel ratio prevents this from being a feasible option. UWS injection, in conjunction with SCR technology, is used in some lean engine configurations. However, UWS SCR technology adds significant cost and control challenges.

SUMMARY

Embodiments described herein relate generally to systems and methods of operating IC engines to increase engine fuel efficiency without affecting aftertreatment system performance and, in particular to operating a first set of cylinders of an IC engine under lean conditions, a second set of cylinders of an IC engine under rich conditions and passing exhaust gas produced by the second set of cylinders through an ammonia generating catalyst.

In a first set of embodiments, a system comprises an engine including a plurality of cylinders. A first intake throttle is positioned upstream of a first set of cylinders included in the plurality of cylinders. The first intake throttle provides air at a first flow rate into the first set of cylinders so as to produce a combustible lean air/fuel mixture in the first set of cylinders included in the plurality of cylinders. A second intake throttle is positioned upstream of a second set of cylinders included in the plurality of cylinders and in parallel of the first intake throttle. The second intake throttle provides air at a second flow rate into the second set of cylinders so as to produce a rich air/fuel mixture in the second set of cylinders irrespective of a load on the engine.

In another set of embodiments, a system comprises an engine having a plurality of cylinders including a first set of cylinders configured to burn an air/fuel mixture at a first equivalence ratio. The first set of cylinders produces an exhaust gas first portion. A second set of cylinders is configured to burn an air/fuel mixture at a second equivalence ratio different from the first equivalence ratio. The second set of cylinders produces an exhaust gas second portion. An ammonia generating catalyst is positioned downstream of and in fluidic communication with the second set of cylinders. The ammonia generating catalyst receives only the exhaust gas second portion and converts NOx gases included in the exhaust gas second portion to ammonia. A selective catalytic reduction system is positioned downstream of the plurality of cylinders. The selective catalytic reduction system receives the exhaust gas first portion and the exhaust gas second portion containing ammonia therewithin.

In yet another set of embodiments, a method of operating an engine including a plurality of cylinders comprises providing a lean air/fuel mixture to a first set of cylinders of the plurality of cylinders. The first set of cylinders are operated at a first compression ratio. A rich air/fuel mixture is provided to a second set of cylinders of the plurality of cylinders. The second set of cylinders are operated at a second compression ratio different from the first compression ratio. An exhaust gas second portion produced by the second set of cylinders is communicated through an ammonia generating catalyst of an aftertreatment system. The exhaust gas second portion is communicated through at least one downstream aftertreatment component of the aftertreatment system. An exhaust gas first portion produced by the first set of cylinders is communicated through the at least one downstream aftertreatment component such that the exhaust gas first portion bypasses the ammonia generating catalyst.

In still another set of embodiments, a system comprises an engine including a plurality of cylinders. A first intake throttle is positioned upstream of the first set of cylinders of the plurality of cylinders. A second intake throttle is positioned upstream of a second set of cylinders included in the plurality of cylinders. An ammonia generating catalyst is positioned downstream of the second set of cylinders. A controller is communicatively coupled to each of the first intake throttle and the second intake throttle. The controller includes a first intake throttle circuitry configured to instruct the first intake throttle to provide air at a first flow rate into the first set of cylinders. The first air flow rate produces a lean air/fuel mixture in the first set of cylinders. A second intake throttle circuitry is configured to instruct the second intake throttle to provide air at a second flow rate into the second set of cylinders. The second flow rate produces a rich air/fuel mixture in the second set of cylinders. An ammonia determining circuitry is configured to determine the molar flow rate of ammonia produced by the ammonia generating catalyst. A NOx determining circuitry is configured to determine the NOx molar flow rate produced by the first set of cylinders. Furthermore, a NOx/ammonia ratio controlling circuitry is configured to control the NOx molar flow rate in the first set of cylinders and ammonia molar flow rate in the second set of cylinders such that the ratio of NOx to ammonia is 1.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
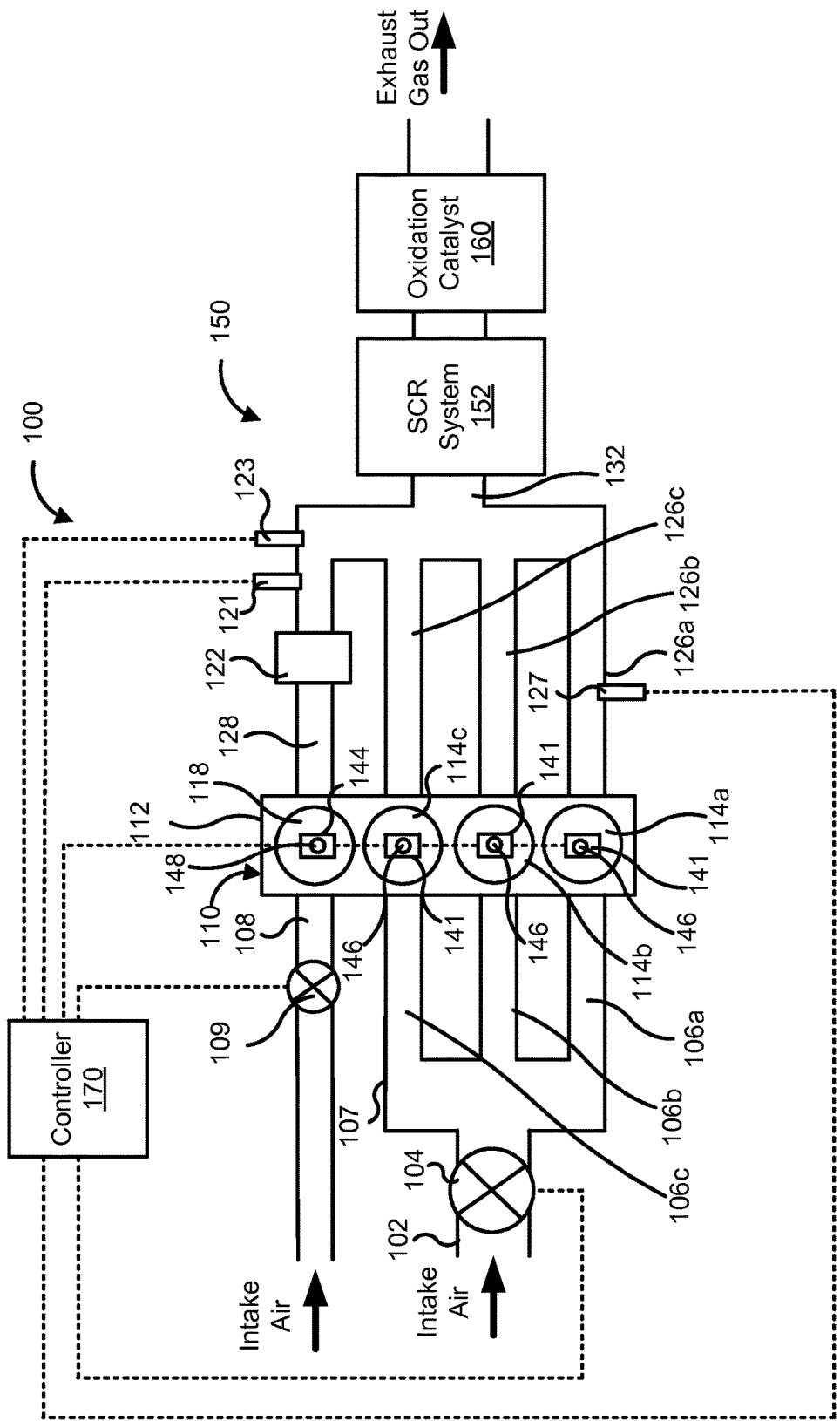
FIG. 1 is a schematic illustration of a system including an IC engine fluidly coupled to an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods of operating IC engines to increase engine fuel efficiency without affecting aftertreatment system performance and, in particular to operating a first set of cylinders of an IC engine under lean conditions, a second set of cylinders of an IC engine under rich conditions and passing exhaust gas produced by the second set of cylinders through an ammonia generating catalyst.

As described herein, the term "lean air/fuel mixture" refers to an air/fuel mixture having a fuel/air equivalence ratio ($\varphi$) of less than 1.0. Similarly, the term "rich air/fuel mixture" refers to an air/fuel mixture having a fuel/air equivalence ratio of higher than 1.0.

As described herein, the term "combustion phasing" refers to the location of combustion relative to the piston at top dead center (TDC), typically measured by crank angle degrees (CAD). A change in combustion phasing causes a change in the location of the piston during the maximum apparent heat release rate, which directly impacts the peak temperatures during combustion.

Operating IC engines, typically run under stoichiometric conditions, such as gasoline engines, ethanol engines, LPG engines or natural gas engines under lean conditions is beneficial as it improves fuel efficiency extending operating range of engines, for example a range of a vehicle including the engine. Lean operation also allows increasing the compression ratio of engine cylinders due to improved resistance to auto-ignition. The increased compression ratio improves combustion stability and increases brake thermal efficiency. However, the three way catalyst generally used in the aftertreatment system associated with such engines cannot efficiently decompose NOx gases included in the exhaust gas at the higher amount of oxygen included in the exhaust gas emitted by engines running on lean air/fuel mixture.

Various embodiments of the systems and methods of operating a first set of cylinders of an engine on a lean air/fuel mixture and a second set of cylinders of the engine on a rich air/fuel mixture may provide benefits including, for example (1) operating the first set of cylinders under lean conditions at all times even, at high engine loads, thereby allowing higher engine efficiency and higher compression ratio due to greater resistance to auto-ignition; (2) increasing engine efficiency and increasing operating range; (3) allowing lower combustion temperatures and heat transfer; (4) generating a reductant in situ via an ammonia generating catalyst receiving a portion of an exhaust gas from a second set of cylinders operating under rich conditions; (5) increasing the average ratio of specific heats of the first set of cylinders allowing more work to be extracted during expansion; (6) reducing pumping losses of the first set of cylinders at part load operation in engines; (7) allowing operating of the second set of cylinders at rich conditions irrespective of the load on the engine; and (8) providing a proportional ratio of ammonia to NOx gases thereby maintaining efficiency of the aftertreatment system for decomposing NOx gases included in the portion of the exhaust gas produced by the first set of cylinders.

FIG. 1 is a schematic illustration of a system 100 that includes an IC engine 110 fluidly coupled to an aftertreatment system 150 and optionally, a controller 170. The IC engine 110 has an engine cylinder block 112 including a plurality of cylinders that include a first cylinder 114a, a second cylinder 114b, a third cylinder 114c (collectively referred to herein as "the first set of cylinders 114") and a fourth cylinder 118. The system 100 includes a first intake throttle 104, a second intake throttle 109. The aftertreatment system 150 includes an SCR system 152 and optionally an oxidation catalyst 160. Each of the plurality of cylinders include a piston (not shown) to compress an air fuel mixture inserted therein to a predetermined compression ratio, as described herein.

An intake manifold 107 is positioned upstream of the first set of cylinders 114. The intake manifold 107 defines an inlet 102 for receiving intake air communicated into the intake manifold 107. In various embodiments, an intercooler (e.g., the intercooler 242 included in the system 200 of FIG. 3) can be positioned upstream of the inlet 102 and configured to reduce a temperature of the intake air, for example to reduce knocking or auto-ignition. The intake manifold 107 divides into a plurality of inlet conduits. The inlet conduits include a first inlet conduit 106a, a second inlet conduit 106b and a third inlet conduit 106c (collectively referred to herein as "the first set of inlet conduits 106") which serve the first cylinder 114a, the second cylinder 114b and the third cylinder 114c. A fourth inlet conduit 108 serves the fourth cylinder 118. The fourth inlet conduit 108 is separate from the inlet 102 and the manifold 107 and positioned in parallel to the inlet 102 and intake manifold 107.

The first intake throttle 104 is positioned upstream of the first set of cylinders 114. The first intake throttle 104 can include a valve (e.g., a butterfly valve), variable valve timing, or any other insertion mechanism configured to meter air flow to the cylinders 114. A first set of fuel metering devices 141 are operatively coupled to the first set of cylinders 114 to insert the fuel therein. Furthermore, a fourth fuel metering device 144 is operatively coupled to the fourth cylinder 118 to insert the fuel therein. The first set of fuel metering devices 141 or the fourth fuel metering device 144 can include a carburetor, a port fuel injector, direction injection fuel injector or any other insertion mechanism configured to meter fuel (e.g. gasoline or an air/fuel mixture) to the first set of cylinders 114 and the fourth cylinder 118.

Moreover, a first set of ignition devices 146 may be operatively coupled to the first set of cylinders 114 and a fourth fuel ignition device 148 is operatively coupled to the fourth cylinder 118, and configured to selectively ignite the air/fuel mixture inserted therein. The first set of ignition devices 146 or the fourth fuel ignition device 148 can include spark ignition, laser ignition, or various forms of compression ignition to initiate combustion of cylinders 114 and the fourth cylinder 118. In various embodiments, a physical ignition device may not be present, for example for compression ignition combustion configurations.

More specifically, the first intake throttle 104 meters air such that a combustible mixture can be achieved for ultra-lean part load conditions for the first set of cylinders 114. For example, the first intake throttle provides air at a first flow rate to the first set of cylinders 114 so as to produce a lean air/fuel mixture in the first set of cylinders 114. The air entering at the first flow rate into the first set of cylinders 114 mixes with the fuel within or upstream of first set of cylinders 114 to produce a lean air/fuel mixture therein. In particular embodiments, the lean air/fuel mixture has an equivalence ratio which has an upper limit defined by the reductant that can be produced in the fourth cylinder 118. Furthermore, the first set of cylinders 114 are operated at a first compression ratio which can be higher than a second compression ratio of the fourth cylinder 118 (or otherwise a second set of cylinders as described herein). For example, the first compression ratio can be in the range of 12 to 15, and the second compression ratio can be in the range of 8 to 11. However, the ranges for the first and second compression ratios can vary.

The first intake throttle 104 controls the first flow rate of the air metered into the first set of cylinders 114 to prevent ultra-lean part load conditions in the first set of cylinders 114 which may result in an incombustible air/fuel mixture. The first set of cylinders 114 are constantly operated under lean conditions irrespective of the load on the engine 110.

The second intake throttle 109 is positioned upstream of the fourth cylinder 118 and in parallel of the first intake throttle 104, for example in the fourth inlet conduit 108 and meters air so that a rich air/fuel mixture is provided in fourth cylinder 118 irrespective of a load on the engine 110. For example, the second intake throttle 109 provides air at a second flow rate into the fourth cylinder 109 so as to produce a rich air/fuel mixture in the fourth cylinder 118.

FIG. 1 shows the second intake throttle 109 positioned in parallel with the first intake throttle 104 but in other embodiments, the second intake throttle 109 can be positioned downstream of the first intake throttle 104. In such embodiments, the fourth inlet conduit 108 can be fluidly coupled to the intake manifold 107 to receive a portion of the intake air inserted into the intake manifold 107. In various embodiments, the first intake throttle 104 can be excluded, for example if a stratified air/fuel mixture is directly inserted into the first set of cylinders 114. For example the first intake throttle 104 may be eliminated via optimized spray guided direction injection, conventional diesel combustion, variable valve lift, or any other combustion system that can operate at ultra-lean, unthrottled conditions or mechanisms other than a throttle to meter air into the first set of cylinders 114.

The second intake throttle 109 can also include a valve (e.g., a butterfly valve), variable valve timing, or any other insertion mechanism configured to meter air flow to the cylinder 118. Fuel metering device 144 can include a carburetor, a port fuel injector, a direct injection fuel injector or any other insertion mechanism configured to provide a fuel (e.g., gasoline, diesel, compressed natural gas (CNG), ethanol, liquid petroleum gas (LPG) or mixtures thereof) or an air/fuel mixture to communicate a predetermined amount of fuel to the fourth cylinder 118.

In some embodiments, the same fuel (e.g., gasoline, diesel, compressed natural gas (CNG), ethanol, liquid petroleum gas (LPG) or mixtures thereof) is provided to the first set of cylinders 114 and the fourth cylinder 118. In other embodiments, the first set of cylinders 114 is provided with a first fuel (e.g., diesel) and the fourth cylinder 118 is provided with a second fuel (e.g., gasoline, diesel, compressed natural gas (CNG), ethanol, liquid petroleum gas (LPG) or mixtures thereof) so as to produce a desired ratio of NOx produced by the first set of cylinders 114, and ammonia produced by the ammonia generating catalyst 122 as described herein (e.g., NOx/ammonia ratio of 1).

More specifically, the second intake throttle 109 provides a second air flow rate into the fourth cylinder 118 so that the fourth cylinder 118 has a rich air/fuel mixture, i.e., an air/fuel mixture having a fuel/air equivalence ratio of greater than 1.0. In particular embodiments, the rich air/fuel mixture has an equivalence ratio in the range of 1.0 to 1.1 (e.g., 1.03). Furthermore, the fourth cylinder 118 is operated at a second compression ratio different from the first compression ratio, for example in the range of 8 to 11. This can allow for improved combustion phasing relative to the baseline case, which increases engine out NOx and therefore ammonia that can be produced across the ammonia generating catalyst 122. The second intake throttle 109 always provides a rich air/fuel mixture to the fourth cylinder 118 so that the fourth cylinder 118 is always operated under rich conditions irrespective of the load on the engine 110. Use of the first intake throttle 104 and the second intake throttle 109 decouples the mass flow rates of the first set of cylinders 114 and the fourth cylinder 118 or otherwise the second set of cylinders.

FIG. 1 shows the engine 110 including four cylinders such that the first set of cylinders 114 operate under lean conditions, while the remaining fourth cylinder 118 operates under rich conditions. It should be appreciated that the engine 110 can include any number of cylinders, for example 6, 8, 10, 12 or even more. Any number of cylinders can be configured to run on the lean air/fuel mixture and the rich air/fuel mixture. For example, in other embodiments, the system 100 can include six cylinders. Four cylinders out of the six cylinders can be configured to operate on the lean air to fuel ratio and comprise the first set of the cylinders. A fifth and sixth cylinder can be configured to operate on the rich air/fuel mixture and comprise a second set of cylinders. In such embodiments, each of the second set of cylinders can have a separate and dedicated second intake throttle or a common second intake throttle. In particular embodiments, the number of cylinders included in the first set of cylinders which operate on the lean air/fuel mixture can be higher than the number of cylinders included in the second set of cylinders operating on the rich air/fuel mixture.

In some embodiments, the engine 110 can include a dual fuel low temperature combustion engine. The first set of cylinders 114 operate under low temperature combustion for high efficiency and low NOx, for example high efficiency homogenous charge compression ignition (HCCI), gasoline compression ignition (GCI), reactivity controlled compression ignition (RCCI), or premixed charge compression ignition (PCCI). In contrast, the fourth cylinder 118 or the second set of cylinders operate using any fuel, for example CNG, gasoline, ethanol or LPG under rich conditions for reductant generation. The lower compression ratio of the fourth cylinder 118 relative to the first set of cylinders 114 allows the fourth cylinder 118 to optimize combustion phasing which increases combustion temperatures and increases NOx production.

Furthermore, the different compression ratios of the first set of cylinders 114 relative to the fourth cylinder 118 allow for improved efficiency mitigating indicated mean effective pressure (IMEP) imbalance. IMEP imbalance can occur when various cylinders of an engine are operated at difference compression ratios or equivalence ratios. Having the higher first compression ratio of the first set of cylinders 114 relative to the second compression of the fourth cylinder 118 allows narrow the IMEP imbalance as well as the power density imbalance due to the inherent equivalence ratio difference.

The first cylinder 114a, the second cylinder 114b and the third cylinder 114c collectively produce an exhaust gas first portion communicated via a first outlet conduit 126a, a second outlet conduit 126b and a third outlet conduit 126c (collectively referred to herein as "the first set of outlet conduits 126") to an exhaust manifold 132. The exhaust gas first portion can include NOx gases, CO and/or unburnt hydrocarbons. The fourth cylinder 118 (or the second set of cylinders) produces an exhaust gas second portion which is communicated via a fourth outlet conduit 128 to the exhaust manifold 132. In various embodiments, a first oxidation catalyst (not shown) can be positioned downstream of the first set of cylinders 114 and configured to decompose constituents, for example CO and unburnt hydrocarbons included in the exhaust gas first portion. In other embodiments, a first oxidation catalyst (not shown) can be positioned downstream of the first set of cylinders 114 and configured to convert NO to $NO_2$, such that the ratio of $NO_2$:NO approaches 1.0 which enables "fast" operation of the SCR system 152.

Since the first set of cylinders 114 are always operated under lean conditions, the engine 110 has improved resistance to auto-ignition. This enables a higher compression ratio to be used in the first set of cylinders 114 for knock limited combustion strategies. Furthermore, the first oxidation catalyst or the SCR system 152 perform under the same lean operating condition so that enhanced thermal stability for stoichiometric conditions, for example of the SCR catalyst included in the SCR system 152 is not necessary.

An ammonia generating catalyst 122 or any other reductant generating catalyst is positioned downstream of the fourth cylinder 118 (or the second set of cylinders) such that the exhaust gas second portion is communicated through the ammonia generating catalyst 122. For example, the ammonia generating catalyst 122 can be positioned in the fourth outlet conduit 128. The ammonia generating catalyst 122 can include a three way catalyst configured to partially decompose CO (e.g., decompose CO into carbon dioxide), unburnt hydrocarbons (e.g., partially decompose unburnt hydrocarbons in carbon dioxide and water) and fully decompose NOx gases included in the exhaust gas second portion with high selectivity to ammonia.

Because the fourth fluid conduit 128 is fluidly isolated from the first set of outlet conduits 126, the exhaust gas first portion bypasses the ammonia generating catalyst 122. In other words, only the exhaust gas second portion passes through the ammonia generating catalyst 122 to generate ammonia while the exhaust gas first portion does not pass through the ammonia generating catalyst 122 so that the rich exhaust gas in the fourth fluid conduit 128 can convert the engine out NOx to ammonia in an overall lean exhaust mixture at the exhaust manifold 132. The exhaust gas first portion and the exhaust gas second portion that includes the ammonia which is generated as the exhaust gas second portion passes through the ammonia generating catalyst 122, combine in the exhaust manifold 132. In various embodiments, the ratio of an amount of NOx gases included in the exhaust gas first portion and the amount of ammonia in the exhaust gas second portion is 1 or approximately 1 (e.g., in the range of 0.9 to 1.1). This balanced ratio of the NOx gases of the amount of NOx to the amount of ammonia enables efficient decomposition of the NOx gases included in the exhaust gas by the SCR system 152, as described herein.

The SCR system 152 is fluidly coupled to the exhaust manifold 132 downstream of the first set of outlet conduits 126 and the fourth outlet conduit 128. The SCR system 152 includes at least one catalyst positioned within an internal volume defined by a housing of the SCR system 152. The catalyst is formulated to selectively reduce constituents of the exhaust gas, for example NOx included in the exhaust gas in the presence of any exhaust reductant. The ammonia included in the exhaust gas second portion serves as the reductant for the NOx gases included in the exhaust gas first portion, thereby obviating the use of a separate reductant supply. Furthermore, the balanced ratio (e.g., in the range of 0.9 to 1.1) of the amount of NOx gases to the amount of ammonia included in the exhaust gas entering the SCR system 152 enhances the efficiency of the SCR system 152.

Any suitable catalyst can be used such as, for example, platinum, palladium, rhodium, cerium, iron, manganese, copper, vanadium based catalysts (including combinations thereof). The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalyst. Such washcoat materials can include, for example, aluminum oxide, titanium dioxide, silicon dioxide, any other suitable washcoat material, or a combination thereof. The exhaust gas can flow over and about the catalyst such that any NOx gases included in the exhaust gas are further reduced in the presence of the ammonia to yield an exhaust gas which is substantially free of carbon monoxide and NOx gases.

Thus, the system 100 allows operation of the first set of cylinders 114 constantly on a lean air to fuel ratio regardless of the operating conditions of the engine 110. Since the first set of cylinders 114 never cycle to operate on a rich air/fuel mixture, this allows the compression ratio to be raised due to greater resistance to auto-ignition. This improves engine efficiency as well as extends the operating range of the engine 110. Operating the dedicated fourth cylinder 118 (or a second set of cylinders which can be smaller in number than the first set of cylinders 114) at the rich conditions provides ammonia via the ammonia generating catalyst 122 to facilitate reduction of the NOx gases contributed by the exhaust gas first portion produced by the first set of cylinders 114. The balanced ratio of the amount NOx gases to the amount of ammonia gas (e.g., 1) facilitates efficient reduction of the NOx gases by the SCR system 152 thus allowing the system 100 to meet strict emission requirements.

The oxidation catalyst 160 (e.g., a second oxidation catalyst) can be positioned downstream of the SCR system 152. In some embodiments, the oxidation catalyst 160 is configured to decompose CO and/or unburnt hydrocarbons included in the exhaust gas, which may have slipped past the SCR. In other embodiments, the oxidation catalyst 160 can be configured to decompose any residual ammonia included in the exhaust gas after passing through the SCR system 152 (e.g., include an ammonia slip catalyst).

The controller 170 can be communicatively coupled to each of the first intake throttle 104 and the second intake throttle 109, the first set of fuel metering devices 141, and the fourth fuel metering device 144, and configured to control the operation thereof. In some embodiments, a first set of fuel ignition devices 146 can be operatively coupled to each of the first set of cylinders 114 and a fourth fuel ignition device 148 is operatively coupled to the fourth cylinder 118 to ignite the air/fuel mixture therein, for example during a compression stroke. In such embodiments, the controller 170 can also be communicatively coupled to the fuel ignition devices 146 and 148, to selectively activate the same for combusting the air/fuel mixture within the first set of cylinders 114 and the fourth cylinder 118.

The controller 170 is communicatively coupled to each of the first intake throttle 104 and the second intake throttle 109, the first set of fuel metering devices 141 and the fourth fuel metering device 144, the first set of fuel ignition devices 146 and the fourth fuel ignition device 148 Furthermore, the controller 170 is also communicatively coupled to an ammonia sensor 121 and an oxygen sensor 123 positioned downstream of the fourth cylinder 118, and a NOx sensor 127 positioned downstream of the first set of cylinders 114.

The controller 170 is configured to instruct the first intake throttle 104 to meter the air flow at ultra-lean conditions for improved combustion stability to the first set of cylinders 114. In some embodiments the first intake throttle 104 may be excluded if advanced technologies such as stratified spray guided direct injection are implemented to allow stable combustion of ultra-lean mixtures. For example, the first intake throttle 104 may be replaced by variable valve actuation or any technology which can meter relative air flow and/or improve combustion stability at ultra-lean conditions. The first intake throttle 104 may also be eliminated if combustion strategies that have inherent stability in ultra-lean conditions (e.g. conventional diesel combustion) are used.

The controller 170 is configured to receive an output NOx signal from the first NOx sensor 127 (e.g., a physical sensor or a virtual NOx sensor) indicative of the amount of NOx, for example a molar flow rate of NOx emanating for the first set of cylinders 114. The output NOx signal is used to control fuel metering devices 141/144 and/or ignition devices 146/148, for example to control outlet NOx levels (e.g., molar NOx flow rate) in the first set of outlet conduits 126.

The controller 170 is also configured to receive an ammonia output signal from the ammonia sensor 121 (e.g., a physical sensor or a virtual ammonia sensor) and instruct the second intake throttle 109 to meter air flow to the fourth cylinder 118 so as to control the molar ammonia flow rate from the ammonia generating catalyst 122. For example, the ammonia sensor 121 is used as an input to the fuel metering device 144 in the fourth cylinder 118. The fuel metering device 144 and/or fuel ignition device 148 are used in conjunction with intake throttle 109 and an oxygen sensor 123 to produce the optimal combustion phasing, air mass flow rate, and air/fuel ratio to attain the requisite NOx to be converted over the ammonia generating catalyst 122. Furthermore, the controller 170 can use an output signal from the oxygen sensor 123 to control the equivalence ratio of the fourth cylinder 118. Moreover, the torque output for the first set of cylinders 114 is controlled based on fueling requirement to operate under lean conditions and the torque output of the fourth cylinder 118 is controlled based on air flow rate as is typical of stoichiometric engines so as to operate the fourth cylinder 118 under rich conditions.

Furthermore, the controller 170, based on the output NOx signal and the output ammonia signal controls relative air mass flow rates through the first intake throttle 104 and the second intake throttle 109 such that the molar flow rate of ammonia generated across ammonia generating catalyst 122 matches the NOx molar flow rate in the first set of outlet conduits 126. For example, the controller 170 can control the air flow rate through the first intake throttle 104 and the second intake throttle 109 so that a ratio of the molar NOx flow rate and the molar ammonia flow rate is 1.

Figure 2:
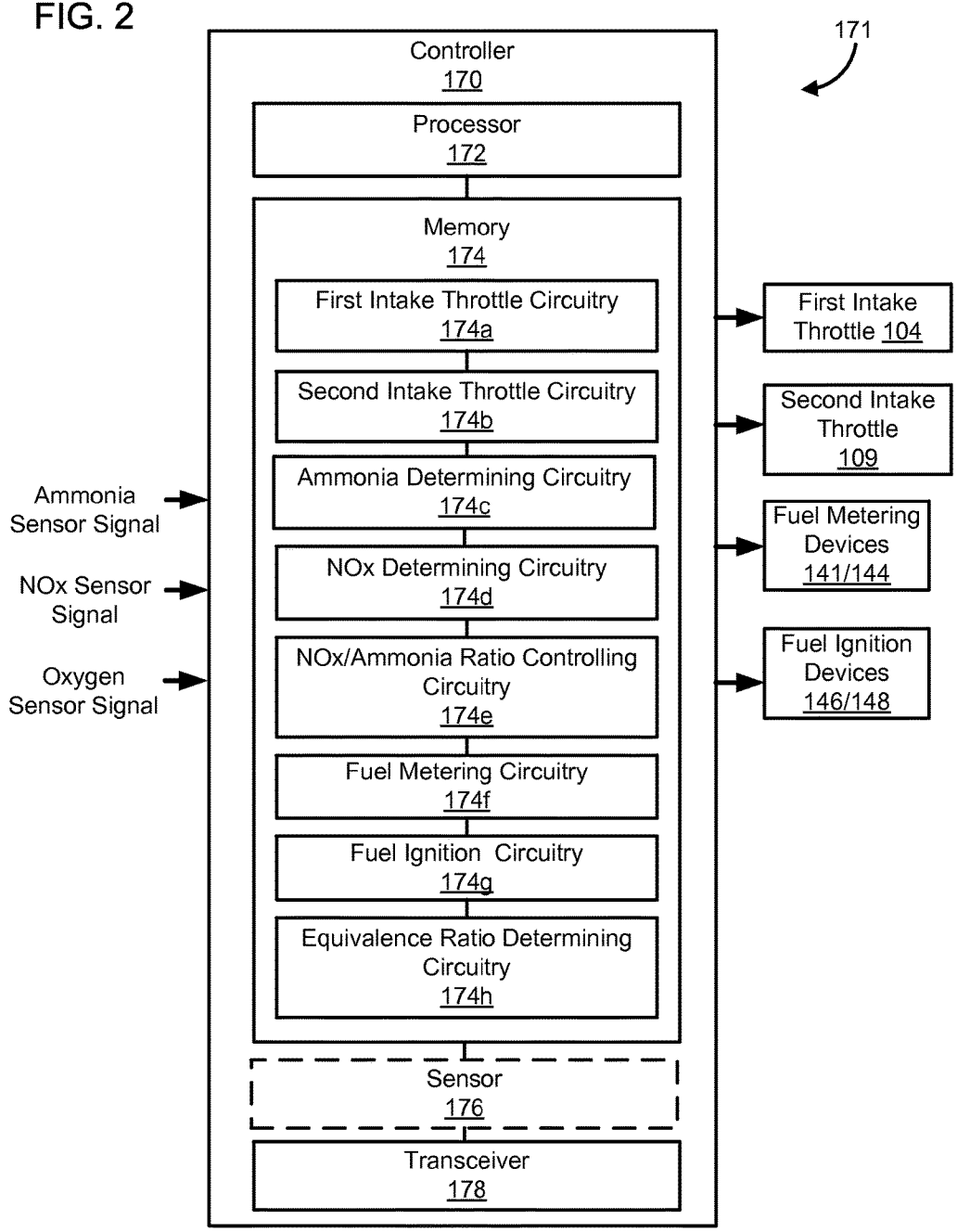
FIG. 2 is a schematic block diagram of one embodiment of a control circuitry that includes a controller which can be included in the system of FIG. 1.

In various embodiments, the controller 170 can be included in a control circuitry. For example, FIG. 2 is a schematic block diagram of a control circuitry 171 that includes the controller 170 according to an embodiment. The controller 170 includes a processor 172, a memory 174 or other computer readable medium, a transceiver 178 and optionally, a sensor 176. It should be understood that the controller 170 shows only one embodiment of the controller 170 and any other controller capable of performing the operations described herein can be used.

The processor 172 can include a microprocessor, programmable logic controller (PLC) chip, an ASIC chip, or any other suitable processor. The processor 172 is in communication with the memory 174 and configured to execute instructions, algorithms, commands or otherwise programs stored in the memory 174.

The memory 174 includes any of the memory and/or storage components discussed herein. For example, memory 174 may include RAM and/or cache of processor 172. Memory 174 may also include one or more storage devices (e.g., hard drives, flash drives, computer readable media, etc.) either local or remote to device controller 170. The memory 174 is configured to store look up tables, algorithms or instructions.

For example, the memory 174 includes a first intake throttle circuitry 174a configured to instruct the first intake throttle 104 to provide an air/fuel mixture at a first equivalence ratio to a first set of cylinders 114 of the plurality of cylinders. The memory 174 also includes a second intake throttle circuitry 174b configured to instruct the second intake throttle 109 to provide an air fuel mixture at a second equivalence ratio to the fourth cylinder 118 (or a second set of cylinders as described herein).

The memory 174 includes a fuel metering circuitry 174f configured to selectively instruct the fuel metering devices 141/144 to insert the fuel or otherwise an air/fuel mixture into the first set of cylinders 114 and the fourth cylinder 118. Furthermore, the memory 174 includes a fuel ignition circuitry 174g to instruct the ignition devices 146/148 to selectively ignite the air/fuel mixture within the first set of cylinders 114 and the fourth cylinder 118.

The memory 174 also includes an ammonia determining circuitry 174c. The ammonia determining circuitry 174c is configured to determine the molar flow rate of ammonia produced by the ammonia generating catalyst 122, for example using the output ammonia signal generated by the ammonia sensor 121. Moreover, the memory 174 also includes a NOx determining circuitry 174d configured to determine the molar flow rate of the NOx produced by the first set of cylinders 114, for example using the output NOx signal generated by the NOx sensor 127.

The controller includes a NOx/ammonia ratio controlling circuitry 174e configured to control the NOx molar flow rate produced by the first set of cylinders 114 and the molar flow rate of the ammonia produced by the fourth cylinder 118 or otherwise the second set of cylinders so that the ratio thereof is 1. For example, the NOx/ammonia ratio controlling circuitry 174e can interpret an existing ammonia and NOx flow rate. The NOx/ammonia ratio controlling circuitry 174e can include look-up tables, algorithms, equations or maps to air flow rates determine the air flow provided by the first intake throttle 104 and the second intake throttle 109 which corresponds to a ratio of the molar flow rate of NOx to ammonia of 1. The NOx/ammonia ratio controlling circuitry 174e instructs the first intake throttle circuitry 174a and the second intake throttle circuitry 174b to control the flow rate of air to the first set of cylinders 114 and the fourth cylinder 118 accordingly.

The NOx/ammonia ratio controlling circuitry 174e can also determine a fuel insertion timing, amount of fuel to be inserted and/or ignition timing for each of the first set of cylinders 114 and the fourth cylinder 118 or otherwise the second set of cylinders which correspond to a ratio of the molar flow rate of NOx to ammonia of 1. For example, the NOx/ammonia ratio controlling circuitry 174e can instruct the first metering circuitry 174f and the fuel ignition circuitry 174g to control the fuel flow rate and/or amount and the ignition time of the first set of cylinders 114 and the fourth cylinder 118 accordingly.

In some embodiments, the memory 174 also includes an equivalence ratio determining circuitry 174h. The equivalence ratio determining circuitry 174h can be used to determine the first equivalence ratio of the first set of cylinders 114 and/or second equivalence ratio of the fourth cylinder 118 or otherwise the second set of cylinders, for example using an oxygen output signal produced by the oxygen sensor 123. The NOx/ammonia ratio controlling circuitry 174e can also be configured to control the first equivalence ratio of the first set of cylinders 114 so as to limit the first equivalence ratio to a maximum level in the first set of cylinders 114. This allows limiting NOx emissions from the first set of cylinders 114 such that the ammonia produced from the ammonia generating catalyst 122 will be able to fully reduce the NOx over the SCR system 152. The pre-determined maximum equivalence ratio may also be used for an engine protection standpoint for knock mitigation. Furthermore, the NOx/ammonia ratio controlling circuitry 174e can also be configured to control the second equivalence ratio of the fourth cylinder 118 to limit the equivalence ratio in a stoichiometric to rich range at all times for the fourth cylinder 118. For example, the NOx/ammonia ratio controlling circuitry 174e can be configured to interpret and use an output signal from the oxygen sensor 123 to control the equivalence ratio of the fourth cylinder 118.

The controller 170 also includes a transceiver 178 configured to generate a first activating signal for activating the first intake throttle 104 and a second activating signal for activating the second intake throttle 109, fuel metering signals for activating the fuel metering devices 141/144, and a fuel ignition signal for activating the fuel ignition devices 146/148. The first activation signal, the second activation signal, the fuel metering signals and/or the fuel ignition signals can include a voltage, a current or any other electrical signal communicated to the first intake throttle 104 and the second intake throttle 109, respectively to perform the activation. In various embodiments, the controller 170 can also include one of many sensors to replace the NOx/ammonia ratio determining circuitry 174e, NOx determining circuitry 174d, and/or ammonia determining circuitry 174c to provide feedback for intake throttles 104 and 109 in addition to fuel metering devices 141 and 144 and ignition devices 146 and 148.

Although not shown in FIG. 1, the aftertreatment system 100 can include other sensors such as, for example, temperature sensors, pressure sensors, and/or any other sensors. The controller 170 may be communicatively coupled to one or more such sensors to receive and interpret signals from one or more of these sensors, for example to determine the NOx molar flow rate in first set of outlet conduits 126 and the ammonia generated across ammonia generating catalyst 122.

Figure 3:
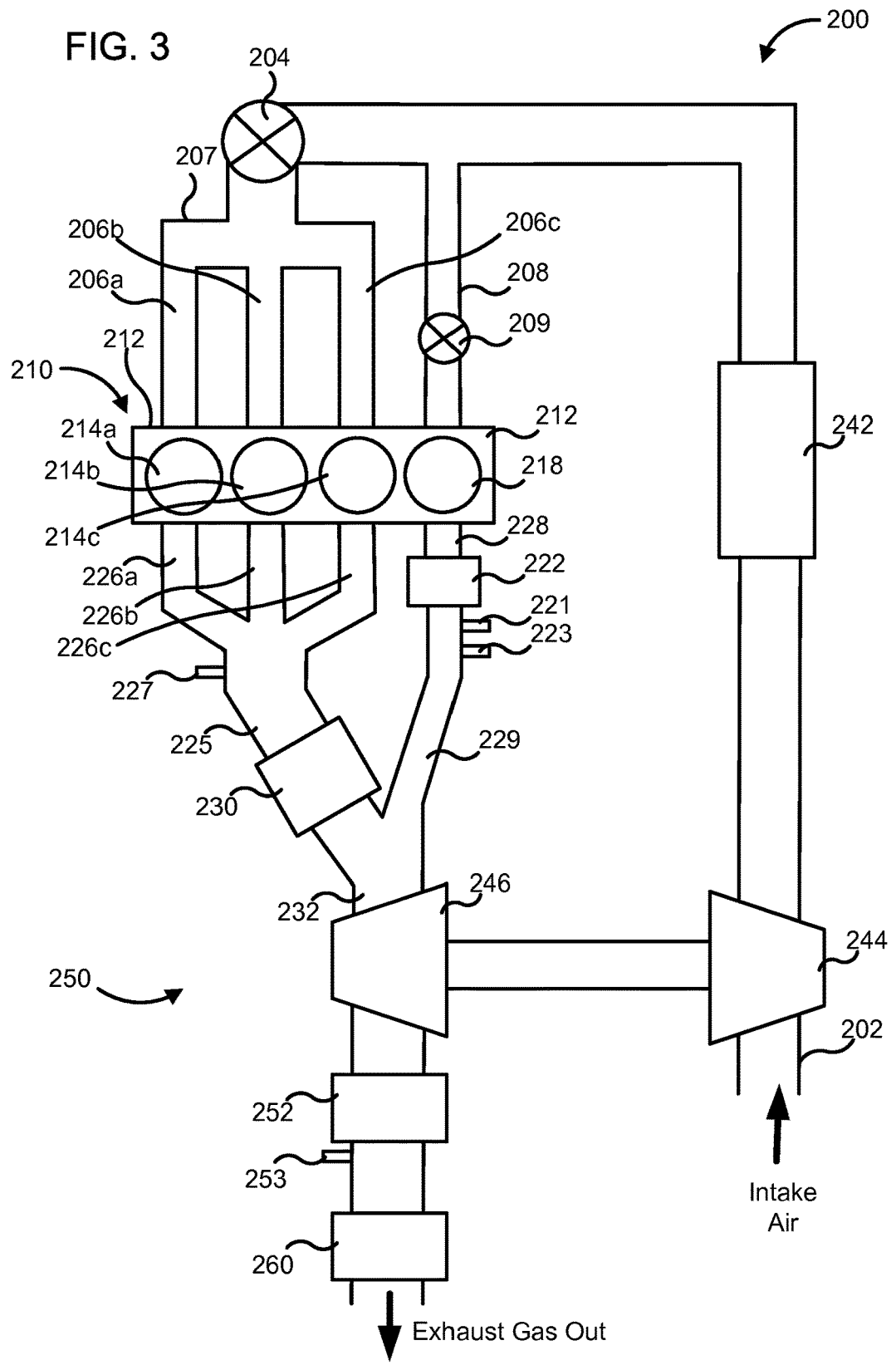
FIG. 3 is a schematic illustration of another embodiment of a system that includes an IC engine fluidly coupled to an aftertreatment system including various aftertreatment components.

FIG. 3 is a schematic illustration of another embodiment of a system 200 that includes an IC engine 210 fluidly coupled to an aftertreatment system 250. The IC engine 210 has an engine cylinder block 212 including a plurality of cylinders that include a first cylinder 214a, a second cylinder 214b, a third cylinder 214c (collectively referred to herein as "the first set of cylinders 214") and a fourth cylinder 218. The system 200 includes a first intake throttle 204, a second intake throttle 209. The aftertreatment system 250 includes an ammonia generating catalyst 222, a first oxidation catalyst 230, a SCR system 252 and a second oxidation catalyst 260. Each of the plurality of cylinders include a piston (not shown) to compress an air fuel mixture inserted therein to a predetermined compression ratio, as described herein.

An intake manifold 207 is positioned upstream of a first set of cylinders 214 of the plurality of the cylinders. Intake air is provided through an inlet 202 fluidly coupled to the intake manifold 207. A compressor 244 (e.g., included in a turbocharger subsystem) is positioned upstream of the intake manifold 207. The compressor 244 is configured to compress the intake air and provide pressurized air to the engine 210 which can increase power output. The compressor 244 is operatively coupled to a turbine 246 (e.g., included in the turbo charger subsystem) positioned within a flow path of an exhaust gas stream produced by the engine 210, as described herein. The exhaust gas flowing through the turbine 246 drives the turbine 246 which in turn drives the compressor 244. An intercooler 242 is positioned upstream of the intake manifold 207 and downstream of the compressor 244. Compressing the intake air by the compressor 244 raises the temperature of the intake air which can lead to knocking or auto-ignition. The intercooler 242 serves to reduce the temperature of the air before communicating the intake air into the engine 210, for example to reduce knocking or auto-ignition. In various embodiments, the intercooler 242 can be excluded from the system 200. Furthermore, the compressor 244 and the turbine 246 can also be excluded from the aftertreatment system 250.

The intake manifold 207 divides into a plurality of inlet conduits. The plurality of inlet conduits include a first inlet conduit 206a, a second inlet conduit 206b and a third inlet conduit 206c (collectively referred to herein as "the first set of inlet conduits 206") which serve the first cylinder 214a, the second cylinder 214b and the third cylinder 214c, respectively. A fourth inlet conduit 208 serves the fourth cylinder 218. The fourth inlet conduit 208 is fluidly coupled to the inlet upstream of the intake manifold 207 and positioned in parallel thereto.

The first intake throttle 204 is positioned upstream of the first set of cylinders 214. The first intake throttle 204 can include a valve (e.g., a butterfly valve), variable valve timing, or any other insertion mechanism configured to meter air flow to the cylinders 214. Fuel metering to the first set of cylinders 214 is achieved through fuel insertion devices (e.g., the first set of fuel metering devices 141), for example a carburetor, a port fuel injector, direct injection fuel injector or any other insertion mechanism configured to provide a fuel (e.g., gasoline) to the first set of cylinders 214. More specifically, the first intake throttle 204 provides air metering to the first set of cylinders 214, such that a combustible mixture is attainable for ultra-lean conditions. In various embodiments, the first intake throttle 204 may be eliminated through variable valve actuation or advanced combustion strategies including stratified spray guided direct injection, high energy ignition systems, or optimized combustion systems for lean environments (e.g. conventional diesel combustion). A lean air/fuel mixture is supplied to the first set of cylinders 214 i.e., an air/fuel mixture having a fuel/air equivalence ratio of less than 1.0. In particular embodiments, the lean air/fuel mixture has an equivalence ratio which is equal to or less than the requisite equivalence ratio to produce a molar NOx flow rate from cylinders 214 equal to the ammonia molar flow rate from the ammonia generating catalyst 222. Furthermore, the first set of cylinders 214 are operated at a first compression ratio which can be higher than that of the fourth cylinder 218 or otherwise a second set of cylinders.

The first intake throttle 204 meters air such that there is always a lean air/fuel mixture to the first set of cylinders 214 and the first set of cylinders 214 are constantly operated under lean conditions irrespective of the load on the engine 210. The second intake throttle 209 is positioned upstream of the first intake throttle and in parallel thereto. The second intake throttle 209 meters air flow to the fourth cylinder 218 independently of the first set of cylinders 214.

The second intake throttle 209 can also include a valve (e.g., butterfly valve), variable valve actuation, or any other insertion mechanism configured to meter air flow. Fuel metering to the fourth cylinder 218 is achieved through fuel insertion devices (e.g., the fourth fuel insertion device), for example a carburetor, a port fuel injector, a direct injection fuel injector, or any other insertion mechanism configured to provide a fuel (e.g., gasoline). More specifically, the second intake throttle 209 meters air such that there is always a rich mixture to the fourth cylinder 218 i.e., a fuel/air equivalence ratio greater than 1.0 irrespective of the load in the fourth cylinder 218. In particular embodiments, the rich air/fuel mixture has an equivalence ratio in the range of 1.0 to 1.1 (e.g., 1.03). Furthermore, the fourth cylinder 218 is operated at a second compression ratio, less than that of the first compression ratio to allow optimal combustion phasing without knock for maximum NOx production in a rich environment prior to the ammonia generating catalyst 222. In various embodiments, a controller (e.g., the controller 170 or control circuitry 171) can be communicatively coupled to the first intake throttle 204 and/or the second intake throttle 209 and configured to control the operation thereof, as described with respect to controller 170 of FIGS. 1 and 2.

The first cylinder 214a, the second cylinder 214b and the third cylinder 214c collectively produce an exhaust gas first portion communicated via a first outlet conduit 226a, a second outlet conduit 226b and a third outlet conduit 226c (collectively referred to herein as "the first set of outlet conduits 226") to an exhaust manifold first leg 225, respectively. The exhaust gas first portion can include a NOx gases, CO and/or unburnt hydrocarbons. A NOx sensor 227, which can include a physical NOx sensor or a virtual (e.g., computational determined) NOx sensor, is positioned in the exhaust manifold first leg 225 and configured to determine an amount of NOx gases in the exhaust gas first portion. In various embodiments, the first oxidation catalyst 230 is positioned within the exhaust manifold first leg 225 downstream of the first set of cylinders 214 and configured to decompose constituents of the exhaust gas first portion, for example CO and unburnt hydrocarbons included in the exhaust gas first portion. The first oxidation catalyst 230 can convert a portion of the NO to $NO_2$, such that an $NO:NO_2$ ratio approaching 1 can be generated at the outlet of catalyst 230, enabling "fast" SCR operation. The exhaust gas first portion is then communicated to an exhaust manifold 232.

The fourth cylinder 218 (or the second set of cylinders) produces an exhaust gas second portion which is communicated to a fourth outlet conduit 228. An ammonia generating catalyst 222 or any other reductant generating catalyst is positioned downstream of the fourth cylinder 218 (or the second set of cylinders) such that the exhaust gas second portion is communicated through the ammonia generating catalyst 222. The ammonia generating catalyst 222 can include a three way catalyst configured to partially decompose CO (e.g., decompose CO into carbon dioxide), partially decompose unburnt hydrocarbons (e.g., decompose unburnt hydrocarbons into carbon dioxide and water) and convert NOx gases included in the exhaust gas second portion into ammonia. The exhaust gas second portion containing the ammonia generated via the ammonia generating catalyst 222 is communicated to the intake manifold via an exhaust manifold second leg 229. An ammonia sensor 221 (e.g., a physical or virtual ammonia sensor) and an oxygen sensor 223 are positioned in the exhaust manifold second leg 229 and configured to determine an amount of ammonia and oxygen (which can be used e.g., to determine an equivalence ratio of the fourth cylinder 218) in the exhaust gas second portion, respectively.

Since the exhaust manifold first leg 225 and the exhaust manifold second leg 229 meet at the exhaust manifold 232, which is positioned downstream of the ammonia generating catalyst 222, the exhaust gas first portion bypasses the ammonia generating catalyst 222. In other words, only the exhaust gas second portion passes through the ammonia generating catalyst 222 to generate ammonia while the exhaust gas first portion does not pass through the ammonia generating catalyst 222 so that the NOx gases included in the exhaust gas first portion do not decompose on reaching the exhaust manifold 232.

The exhaust gas first portion and the exhaust gas second portion that includes the ammonia generated as the exhaust gas second portion passes through the ammonia generating catalyst 222 combine in the exhaust manifold 232. In various embodiments, the ratio of an amount of NOx gases included in the exhaust gas first portion and the amount of ammonia in the exhaust gas second portion is 1 or approximately 1 (e.g., in the range of 0.9 to 1.1). This balanced ratio of the amount of NOx gases to the amount of ammonia enables efficient decomposition of the NOx gases included in the exhaust gas by the SCR system 252, as described herein. For example, the controller 170 or any other controller described herein can monitor the molar amount of NOx as determined by the NOx sensor 227 and a molar amount of ammonia as determined by the ammonia sensor 221. The controller 170 can use this information to control activation of the first intake throttle 204, the second intake throttle 209, fuel metering devices and/or fuel ignition devices to maintain the ratio of an amount of NOx gases included in the exhaust gas first portion and the amount of ammonia in the exhaust gas second portion to be 1.

The turbine 246 is positioned downstream of the exhaust manifold first leg 225 and the exhaust manifold second leg 229. The exhaust gas flowing through the turbine 246 rotates the turbine 246 to drive the compressor 244 for forcing intake air into the intake manifold 207 as described before herein. The SCR system 252 is positioned downstream of the turbine 246. The SCR system 252 includes at least one catalyst positioned within an internal volume defined by a housing of the SCR system 252. The SCR system 252 can be substantially similar to the SCR system 152 described with respect to the system 100 of FIG. 1 and therefore, not described in further detail herein.

Thus, the system 200 allows operation of the first set of cylinders 214 constantly on a lean air/fuel mixture regardless of the operating conditions of the engine 210. Since the first set of cylinders 214 never cycle to operate on a rich air/fuel mixture, this allows the compression ratio to be raised due to greater resistance to auto-ignition. This improves engine efficiency as well as extends the operating range of the engine 210, as described herein with respect to the system 100. In various embodiments, operation of first set of cylinders 214 constantly on the lean air/fuel mixture results in an overall efficiency increase of the engine of greater than 10%, for example 11%, 12%, 13%, 14%, 15%, 16%, 17%, 18%, 19% or 20% inclusive of all ranges and values therebetween or even higher.

Operation of the first set of cylinders 214 may include, but is not limited to conventional diesel combustion, lean burn gasoline combustion, gasoline compression ignition (GCI), premixed charge compression ignition (PCCI), reactivity controlled compression ignition (RCCI), homogeneous charge compression ignition (HCCI), or any other high efficiency lean and relatively low NOx combustion strategy. Lower NOx combustion strategies may result in higher overall performance since the requisite NOx reduction potential of the rich cylinder 218 is reduced. This may reduce the ratio of rich to lean cylinders.

The fourth cylinder 218 or otherwise the second set of cylinders may be operated using a different combustion strategy or fuel of the lean strategy (e.g. gasoline may be run in the rich cylinders while conventional diesel run in the lean cylinders) relative to the first set of cylinders 214. Fuel used in the rich cylinder 218 may include but not limited to compressed natural gas, gasoline, ethanol, liquefied petroleum gas, or any other fuel and combustion strategy which can result in a rich exhaust mixture to convert NOx to ammonia across the ammonia generating catalyst 222.

The compression ratio of the fourth cylinder is limited by the auto-ignition characteristics of the fuel used. The compression ratio is configured such that combustion phasing is optimized to produce high engine out NOx for the fourth cylinder 218 during rich operation so that maximum NOx reduction potential of the fourth cylinder 218 may be achieved. A NOx sensor 253 is positioned downstream of the SCR system 252 and configured to measure the amount of NOx in the exhaust gas flowing out of the SCR system 252. The second oxidation catalyst 260 (e.g., a second oxidation catalyst) is positioned downstream of the SCR system 252. In some embodiments, the second oxidation catalyst 260 is configured to decompose CO and/or unburnt hydrocarbons included in the exhaust gas. In other embodiments, the second oxidation catalyst 260 is configured to decompose any residual ammonia included in the exhaust gas after passing through the SCR system 252 (e.g., include an ammonia slip catalyst).

Exhaust gas recirculation may be used in various forms and engine configurations such that EGR is introduced for the lean cylinders 214, but not the rich cylinders 218. This method of operation may have slight efficiency impacts for the lean cylinders, but will significantly reduce the engine out NOx of the lean cylinders, enabling extended load range and/or lowered ratio of rich to lean cylinders.

Figure 4:
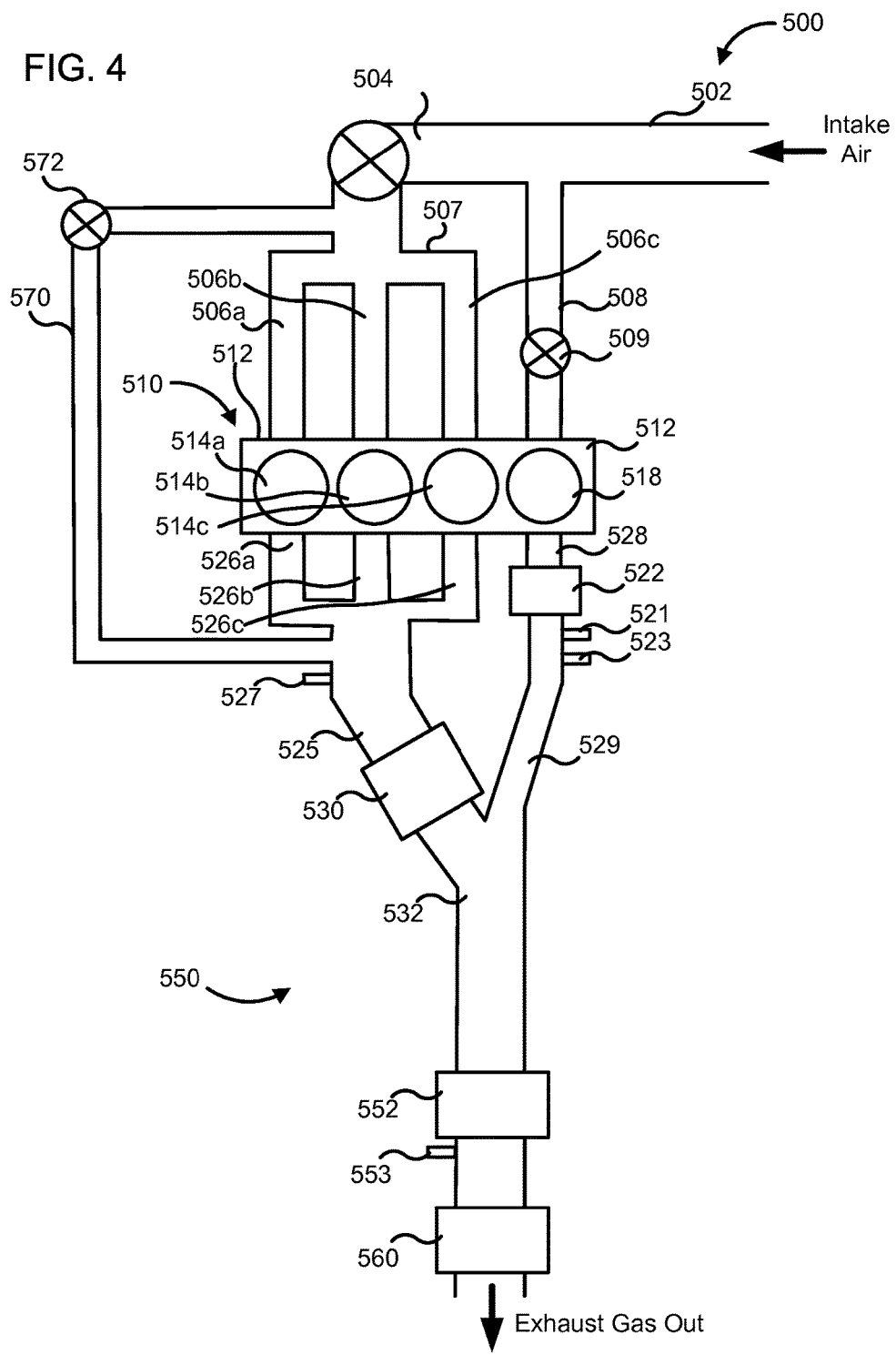
FIG. 4 is a schematic illustration of yet another embodiment of a system including an IC engine fluidly coupled to an aftertreatment system.

For example, FIG. 4 is a schematic illustration of another embodiment of a system 500 that includes an IC engine 510 fluidly coupled to an aftertreatment system 550. The IC engine 510 has an engine cylinder block 512 including a plurality of cylinders that include a first cylinder 514a, a second cylinder 514b, a third cylinder 514c (collectively referred to herein as "the first set of cylinders 514") and a fourth cylinder 518. The engine 510 and thereby, the first set of cylinders 514 and the fourth cylinder 518 included therein can be substantially similar in structure and function to the engine 210 or 110 described herein and, therefore not described in further detail herein.

The system 500 includes a first intake throttle 504 and a second intake throttle 509, which are substantially similar to the first intake throttle 104/204 and the second intake throttle 109/209 described before herein. The aftertreatment system 550 also includes an ammonia generating catalyst 522, a first oxidation catalyst 530, a SCR system 552 and a second oxidation catalyst 560, which are substantially similar to the ammonia generating catalyst 122/222, the first oxidation catalyst 230, the SCR system 152/252 and the second oxidation catalyst 160/260, respectively described before herein. While not shown, in some embodiments, the system 500 can also include an intercooler (e.g., the intercooler 242), a compressor (e.g., the compressor 244) and/or the turbine (e.g., the turbine 246) as shown in the aftertreatment system 200 of FIG. 3 described herein.

An intake manifold 507 is positioned upstream of a first set of cylinders 541 of the plurality of the cylinders. Intake air is provided through an inlet 502 fluidly coupled to the intake manifold 507. The intake manifold 507 divides into a plurality of inlet conduits. The plurality of inlet conduits include a first inlet conduit 506a, a second inlet conduit 506b and a third inlet conduit 506c (collectively referred to herein as "the first set of inlet conduits 506") which serve the first cylinder 514a, the second cylinder 514b and the third cylinder 514c, respectively. A fourth inlet conduit 508 serves the fourth cylinder 518. The fourth inlet conduit 508 is fluidly coupled to the inlet upstream of the intake manifold 507 and positioned parallel thereto.

The first intake throttle 504 is positioned upstream of the first set of cylinders 514. The second intake throttle 509 is positioned upstream of the first intake throttle 504 and in parallel thereto. The second intake throttle 509 meters air flow to the fourth cylinder 518 independently of the first set of cylinders 514. The first cylinder 514a, the second cylinder 514b and the third cylinder 514c collectively produce an exhaust gas first portion communicated via a first outlet conduit 526a, a second outlet conduit 526b and a third outlet conduit 526c (collectively referred to herein as "the first set of outlet conduits 526") to an exhaust manifold first leg 525, respectively. A NOx sensor 527 is operatively coupled to the exhaust manifold first leg 525 to measure an amount (e.g., a molar amount of NOx gases) in the exhaust gas first portion.

In various embodiments, the first oxidation catalyst 530 is positioned within the exhaust manifold first leg 525 downstream of the first set of cylinders 514. The fourth cylinder 518 (or the second set of cylinders) produces an exhaust gas second portion which is communicated to a fourth outlet conduit 528. The ammonia generating catalyst 522 or any other reductant generating catalyst is positioned downstream of the fourth cylinder 518 (or the second set of cylinders) such that the exhaust gas second portion is communicated through the ammonia generating catalyst 522. An ammonia sensor 521 and an oxygen sensor 523 are positioned downstream of the ammonia generating catalyst 522.

The aftertreatment system 500 also includes an exhaust gas recirculation (EGR) system for recirculating a portion of the exhaust gas first portion from the exhaust manifold first leg 525 to the intake manifold 507. The EGR system includes an EGR conduit 570 fluidly coupling the exhaust manifold first leg 525 to the intake manifold 507. An EGR valve 572 is positioned within the EGR conduit 570 and structured to control the flow rate of the portion of the exhaust gas first portion from the exhaust manifold first leg 525 to the intake manifold 507. The recirculated portion of the exhaust gas first portion dilutes the $O_2$ in the intake air stream and provides gases inert to combustion to act as absorbents of combustion heat to reduce peak temperature in first set of cylinders 514 operating on lean air/fuel mixture.

Figure 5:
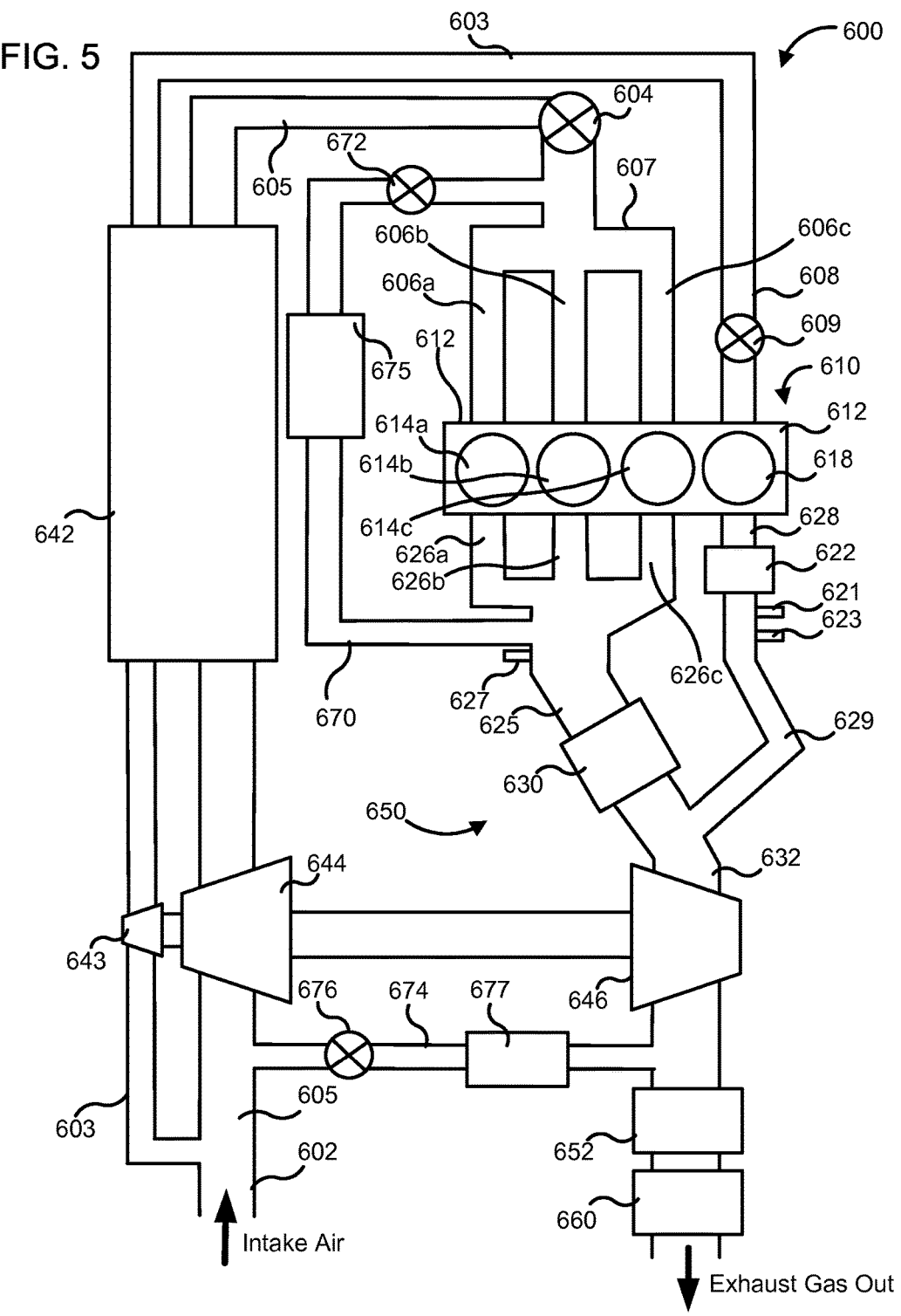
FIG. 5 is a schematic illustration of still another embodiment of a system including an IC engine fluidly coupled to an aftertreatment system.

In some embodiments, an aftertreatment system coupled to an engine can also include a low pressure and high pressure EGR loop, an intercooler and/or a turbocharger. For example, FIG. 5 is a schematic illustration of another embodiment of a system a system 600 that includes an IC engine 610 fluidly coupled to an aftertreatment system 650. The IC engine 610 has an engine cylinder block 612 including a plurality of cylinders that include a first cylinder 614a, a second cylinder 614b, a third cylinder 614c (collectively referred to herein as "the first set of cylinders 614") and a fourth cylinder 618. The engine 610 and thereby, the first set of cylinders 614 and the fourth cylinder 618 included therein can be substantially similar in structure and function to the engine 110/210/510 described herein and, therefore not described in further detail herein.

The system 600 includes a first intake throttle 604 and a second intake throttle 609, which are substantially similar to the first intake throttle 104/204/504 and the second intake throttle 109/209/509 described before herein. The aftertreatment system 650 also includes an ammonia generating catalyst 622, a first oxidation catalyst 630, a SCR system 652 and a second oxidation catalyst 660, which are substantially similar to the ammonia generating catalyst 122/222/522, the first oxidation catalyst 230/530, the SCR system 152/252/552 and the second oxidation catalyst 160/260/560 described before herein.

An intake manifold 607 is positioned upstream of a first set of cylinders 614 of the plurality of the cylinders. Intake air is provided through an inlet 602 which divides into a first inlet 605 fluidly coupled to the intake manifold 607, and a second inlet 603. The intake manifold 607 divides into a plurality of inlet conduits. The plurality of inlet conduits include a first inlet conduit 606a, a second inlet conduit 606b and a third inlet conduit 606c (collectively referred to herein as "the first set of inlet conduits 606") which serve the first cylinder 614a, the second cylinder 614b and the third cylinder 614c, respectively. The first intake throttle 604 is positioned in the intake manifold 607 and structured to control a first air flow rate into the first set of inlet conduits 606 and, thereby the first set of cylinders 614.

The second inlet 603 is fluidly coupled to the fourth inlet conduit 608 serving the fourth cylinder 618. The fourth inlet conduit 608 is fluidly coupled to the inlet upstream of the intake manifold 607 and positioned parallel thereto. The second intake throttle 609 is positioned in the fourth inlet conduit 608 and structured to control a second flow rate of air into the fourth inlet conduit 608 and, thereby the fourth cylinder 608.

An intercooler 642 is positioned upstream of the intake manifold 607 and the fourth inlet conduit 608 and fluidly coupled to the first inlet 605 and the second inlet 603. The first intake throttle 604 is positioned downstream of the intercooler 642, while the second intake throttle 609 is positioned upstream of the fourth cylinder 618 and downstream of the intercooler 642. A turbine 646 is positioned in an exhaust manifold 632 and operatively coupled to a first compressor 644 operatively coupled to the first inlet 605 and a second compressor 643 operatively coupled to the second inlet 603. An exhaust gas first portion from the first set of cylinders 614 and an exhaust gas second portion from the fourth cylinder 618 combine in the exhaust manifold 632 before entering the turbine 646. The combined exhaust gas powers the turbine 646 which operates the first compressor 644 and the second compressor 643 to compress the intake air provided to the first set of cylinders 614 and the fourth cylinder 618, as described herein.

The second intake throttle 609 meters air flow to the fourth cylinder 618 independently of the first set of cylinders 614. The first cylinder 614a, the second cylinder 614b and the third cylinder 614c collectively produce an exhaust gas first portion communicated via a first outlet conduit 626a, a second outlet conduit 626b and a third outlet conduit 626c (collectively referred to herein as "the first set of outlet conduits 626") to the exhaust manifold first leg 625, respectively. A NOx sensor 627 is operatively coupled to the exhaust manifold first leg 625 to measure an amount (e.g., a molar amount of NOx gases) in the exhaust gas first portion.

In various embodiments, the first oxidation catalyst 630 is positioned within the exhaust manifold first leg 625 downstream of the first set of cylinders 614. The fourth cylinder 618 (or the second set of cylinders) produces an exhaust gas second portion which is communicated to a fourth outlet conduit 628. The ammonia generating catalyst 622 or any other reductant generating catalyst is positioned downstream of the fourth cylinder 618 (or the second set of cylinders) such that the exhaust gas second portion is communicated through the ammonia generating catalyst 622. An ammonia sensor 621 and an oxygen sensor 623 is positioned downstream of the ammonia generating catalyst 622.

The system 600 also includes EGR system including a high pressure loop and a low pressure loop. The high pressure loop includes a first EGR conduit 670 fluidly coupling the exhaust manifold first leg 625 upstream of the first oxidation catalyst 630 to the intake manifold 607 downstream of the first intake throttle 604, and structured to recirculate a portion of the high pressure exhaust gas first portion from the exhaust manifold first leg 625 to the intake manifold. A first EGR valve 672 is positioned within the first EGR conduit 670 to control an amount of the portion of the high pressure exhaust gas first portion recirculated to the intake manifold 607. A high pressure EGR cooler 675 is fluidly coupled to the first EGR conduit 670 and is structured to cool the high pressure exhaust gas first portion recirculated to intake manifold 607.

The low pressure loop includes a second EGR conduit 674 fluidly coupling an exhaust manifold 632 downstream of the turbine 646 and upstream of the SCR system 652 to the first inlet 605 upstream of the first compressor 644. The second EGR conduit 674 recirculates a portion of the exhaust gas from the exhaust manifold 632, which is at a lower pressure than the exhaust gas first portion after expansion in the turbine 646, to the first inlet 605. A second EGR valve 676 is positioned within the second EGR conduit 674 to control an amount of the portion of the low pressure exhaust gas recirculated to the first inlet 605. Furthermore, a low pressure EGR cooler 677 is fluidly coupled to the second EGR conduit 674 and is structured to cool the portion of the low pressure exhaust gas recirculated to the first inlet 605.

Figure 6:
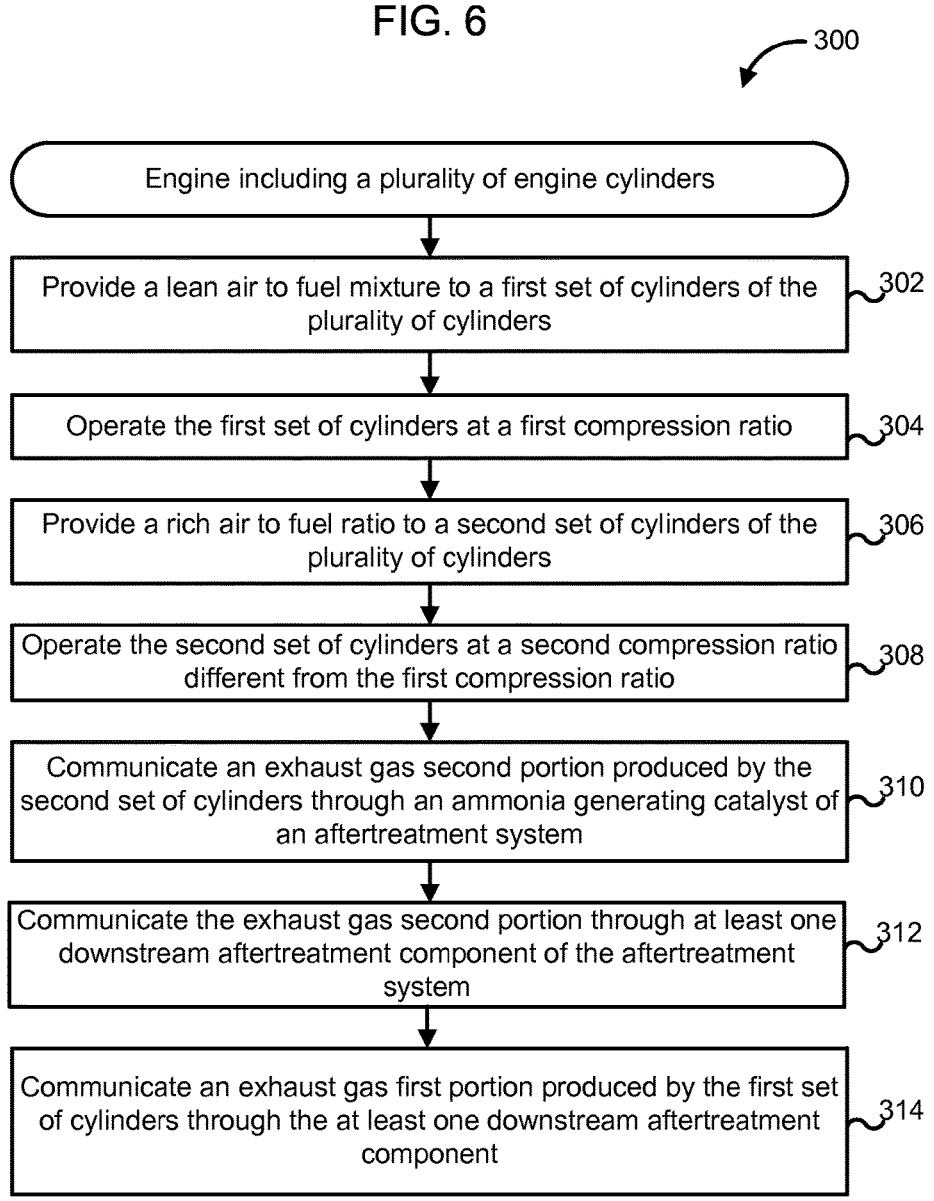
FIG. 6 is a schematic flow diagram of an embodiment of a method for operating a plurality of cylinders of an IC engine.

FIG. 6 is a schematic flow diagram of an example method 300 of operating an engine which includes a plurality of cylinders, for example the engine 110, 210, 510 or 610 as described herein. The engine is fluidly coupled to an aftertreatment system, for example the aftertreatment system 150, 250, 550 or 650. The operations of the method 300 can be stored in the form of instructions on a non-transitory CRM (e.g., the memory 174 of the controller 170, or main memory 736, read only memory (ROM) 738 or storage device 740 included in the computing device 730 of FIG. 7). The CRM can be included in a computing device (e.g., the computing device 730) which is configured to execute the instructions stored on the CRM to perform the operations of the method 300.

The method 300 includes providing a lean air/fuel mixture to a first set of cylinders of the plurality of cylinders at 302. For example, the limited use of intake throttle 104/204/504/604 combined with proper fueling strategy provides a lean air/fuel mixture to the first set of cylinders 114/214/514/614 of the engine 110/210/510/610. In various embodiments, the lean air/fuel mixture has a pre-determined not to exceed equivalence ratio threshold so that the molar flow rate of NOx of the first set of cylinders 114/214/514/614 does not exceed the maximum molar flow rate of ammonia from the second set of cylinders 118/218/518/618. The first set of cylinders are operated at a first compression ratio at 304 to optimize lean combustion strategies such as conventional diesel, lean burn gasoline, or other high efficiency low temperature combustion strategies.

A rich air to fuel ratio is provided to a second set of cylinders of the plurality of cylinders 306. For example, the rich air to fuel ratio is provided to the fourth cylinder 118/218/518/618 or otherwise a second set of cylinders as described before herein. In various embodiments, the rich air/fuel mixture has a second equivalence ratio configured to produce a stoichiometric air/fuel mixture if no NOx reduction is needed and adjustable to produce a rich air/fuel mixture such that ammonia production across the catalyst is maximized. The second set of cylinders is operated at a second compression ratio different from the first compression ratio at 308. The second compression ratio is limited by the fuel used in the second set of cylinders, so that optimal combustion phasing for NOx production can be achieved without uncontrolled auto-ignition.

An exhaust gas second portion produced by the second set of cylinders is communicated through an ammonia generating catalyst of an aftertreatment system at 310. For example, the exhaust gas second portion produced by the fourth cylinder 118/218/518/618 is communicated through the ammonia generating catalyst 122/222/522/622 included in the aftertreatment system 150/250/550/650, respectively as described before herein. The ammonia generating catalyst can include, for example a three way catalyst formulated to partially decompose CO and unburnt hydrocarbons included in the exhaust gas second portion, as well as convert NOx gases into ammonia, as described before herein.

The exhaust gas second portion is communicated through at least one downstream component of the aftertreatment system at 312. For example, the exhaust gas second portion is communicated through the SCR system 152/252/552/652, and/or the second oxidation catalyst 160/260/560/660 included in the aftertreatment system 150/250/550/650, as described before herein. An exhaust gas first portion produced by the first set of cylinders is also communicated through the at least one downstream aftertreatment component at 314. The exhaust gas first portion bypasses the ammonia generating catalyst. For example, the exhaust gas first portion produced by the first set of cylinders 114/214/514/614 is communicated through the first oxidation catalyst 230/530/630 or an exhaust manifold first leg (e.g., the exhaust portion first leg 225/525/625) to the exhaust manifold 132/232/532/632 and therefrom to the downstream SCR system 152/252/552/652, and/or the second oxidation catalyst 160/260/560/660, as described before herein. A ratio of an amount of NOx gases included in the exhaust gas first portion and an amount of ammonia in the exhaust gas second portion can be 1 or approximately 1 (e.g. in the range of 0.9 to 1.1). The balanced ratio increases the efficiency of the SCR system 152/252/552/652 in reducing the NOx gases included in exhaust gas second portion facilitated by the ammonia provided by the exhaust gas second portion which serves as the reductant.

Figure 7:
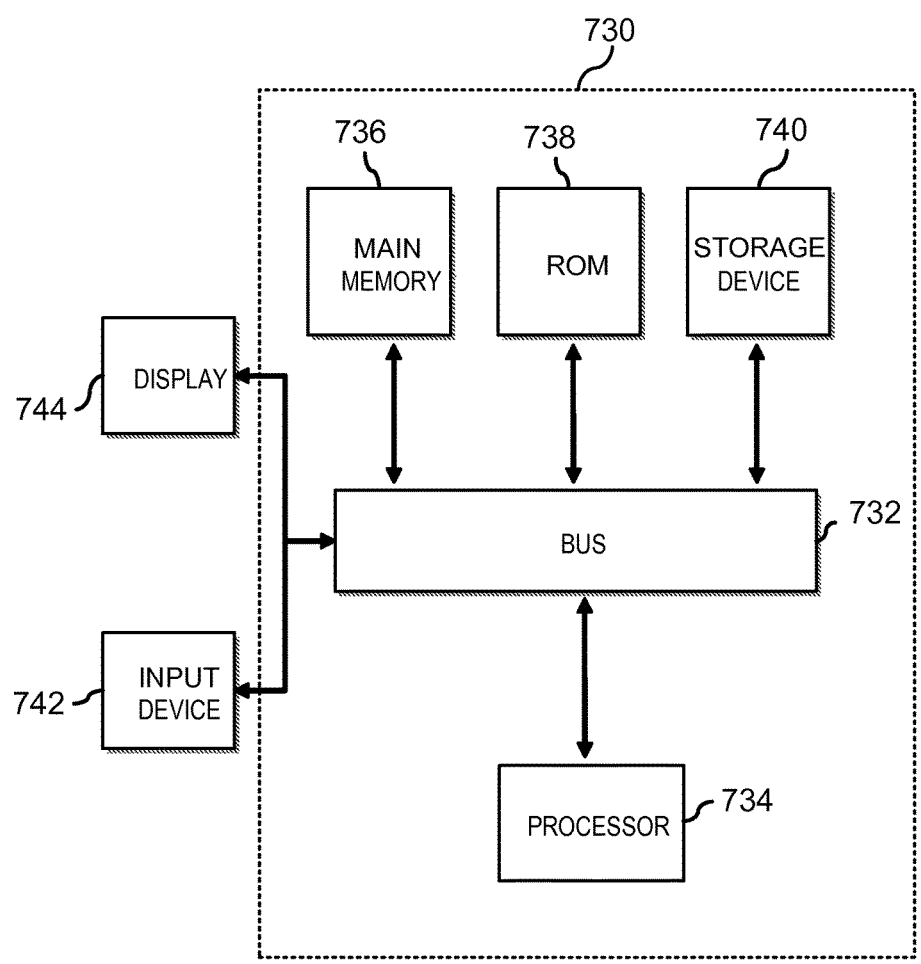
FIG. 7 is a schematic block diagram of a computing device which can be used as the controller of FIG. 1 and/or FIG. 2.

In some embodiments, the controller 170, the control circuitry 171 or any of the controller or control circuitries described herein can comprise a system computer of an apparatus or system which includes the aftertreatment system 100 or 200 (e.g., a vehicle, an engine or generator set, etc.). For example, FIG. 7 is a block diagram of a computing device 730 in accordance with an illustrative implementation. The computing device 730 can be used to perform any of the methods or the processes described herein, for example the method 300. In some embodiments, the controller 170 can include the computing device 730. The computing device 730 includes a bus 732 or other communication component for communicating information. The computing device 730 can also include one or more processors 734 or processing circuits coupled to the bus for processing information.

The computing device 730 also includes main memory 736, such as a random access memory (RAM) or other dynamic storage device, coupled to the bus 732 for storing information, and instructions to be executed by the processor 734. Main memory 736 can also be used for storing position information, temporary variables, or other intermediate information during execution of instructions by the processor 734. The computing device 730 may further include ROM 738 or other static storage device coupled to the bus 732 for storing static information and instructions for the processor 734. A storage device 740, such as a solid-state device, magnetic disk or optical disk, is coupled to the bus 732 for persistently storing information and instructions. For example instructions for determining the first equivalence ratio and the second equivalence ratio can be stored in the storage device 740.

The computing device 730 may be coupled via the bus 732 to a display 735, such as a liquid crystal display, or active matrix display, for displaying information to a user. An input device 742, such as a keyboard or alphanumeric pad, may be coupled to the bus 732 for communicating information and command selections to the processor 734. In another implementation, the input device 742 has a touch screen display 744.

According to various implementations, the processes and methods described herein can be implemented by the computing device 730 in response to the processor 734 executing an arrangement of instructions contained in main memory 736 (e.g., the operations of the method 300). Such instructions can be read into main memory 736 from another non-transitory computer-readable medium, such as the storage device 740. Execution of the arrangement of instructions contained in main memory 736 causes the computing device 730 to perform the illustrative processes described herein. One or more processors in a multi-processing arrangement may also be employed to execute the instructions contained in main memory 736. In alternative implementations, hard-wired circuitry may be used in place of or in combination with software instructions to effect illustrative implementations. Thus, implementations are not limited to any specific combination of hardware circuitry and software.

Although an example computing device has been described in FIG. 7, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system comprising:
an engine comprising a plurality of cylinders including a first set of cylinders and a second set of cylinders;
a first intake throttle positioned upstream of the first set of cylinders, the first intake throttle being configured to provide air at a first flow rate to the first set of cylinders so as to produce a combustible lean air/fuel mixture in the first set of cylinders; and
a second intake throttle positioned upstream of the second set of cylinders and in parallel with the first intake throttle, the second intake throttle being configured to provide air at a second flow rate to the second set of cylinders so as to produce a rich air/fuel mixture in the second set of cylinders irrespective of a load on the engine,
wherein the engine is configured such that, during operation of the engine, the first set of cylinders are operated at a first compression ratio and the second set of cylinders are operated at a second compression ratio that is less than the first compression ratio.

2. The system of claim 1, further comprising:
an ammonia generating catalyst positioned downstream of the second set of cylinders, the first set of cylinders being configured to produce an exhaust gas first portion bypassing the ammonia generating catalyst, and the second set of cylinders being configured to produce an exhaust gas second portion communicated through the ammonia generating catalyst,
wherein the ammonia generating catalyst is configured to convert NOx gases included in the exhaust gas second portion into ammonia.

3. The system of claim 2, wherein a ratio of an amount of NOx gases included in the exhaust gas first portion and the amount of ammonia in the exhaust gas second portion is 1.

4. The system of claim 2, wherein the lean air/fuel mixture has a first equivalence ratio such that a molar flow rate of NOx in the first set of cylinders is equal to a molar flow rate of ammonia produced by the ammonia generating catalyst.

5. The system of claim 4, wherein the rich air/fuel mixture has a second equivalence ratio, the second equivalence ratio in the range of 1.0 to 1.1.

6. The system of claim 1, wherein the first compression ratio is configured so as to provide a high brake thermal efficiency of the first set of cylinders operating on the lean air/fuel mixture.

7. The system of claim 1, wherein the second compression ratio is configured so as to allow optimal combustion phasing of the rich air/fuel mixture used in the second set of cylinders while avoiding uncontrolled auto-ignition.

8. The system of claim 1, wherein the engine is configured such that, during operation of the engine, a first fuel is provided to the first set of cylinders and a second fuel is provided to the second set of cylinders, the second fuel being different than the first fuel.

9. The system of claim 8,
wherein the first fuel is diesel fuel, and
wherein the second fuel does not include diesel fuel.

10. A system comprising:
an engine having a plurality of cylinders including:
a first set of cylinders configured to burn an air/fuel mixture at a first equivalence ratio, the first set of cylinders being configured to produce an exhaust gas first portion, the first set of cylinders being configured to operate at a first compression ratio, and
a second set of cylinders configured to burn an air/fuel mixture at a second equivalence ratio different from the first equivalence ratio, the second set of cylinders being configured to produce an exhaust gas second portion, the second set of cylinders being configured to operate at a second compression ratio that is less than the first compression ratio;
an ammonia generating catalyst positioned downstream of and in fluidic communication with the second set of cylinders, the ammonia generating catalyst being configured to receive only the exhaust gas second portion and being configured to convert NOx gases included in the exhaust gas second portion to ammonia; and
a selective catalytic reduction system positioned downstream of the plurality of cylinders, the selective catalytic reduction system being configured to receive the exhaust gas first portion and the exhaust gas second portion containing ammonia therewithin.

11. The system of claim 10, wherein a ratio of an amount of NOx gases included in the exhaust gas first portion and an amount of ammonia in the exhaust gas second portion before entering the selective catalytic reduction system is 1.

12. The system of claim 10, wherein the first equivalence ratio is selected such that a molar flow rate of NOx in the first set of cylinders is equal to a molar flow rate of ammonia produced by the ammonia generating catalyst, and wherein the second equivalence ratio is in the range of 1.0 to 1.1.

13. The system of claim 10, wherein the first compression ratio is configured so as to provide a high brake thermal efficiency of the first set of cylinders operating on the lean air/fuel mixture.

14. The system of claim 10, wherein the second compression ratio is configured so as to allow optimal combustion phasing of the rich air/fuel mixture used in the second set of cylinders while avoiding uncontrolled auto-ignition.

15. The system of claim 10, further comprising:
a first intake throttle positioned upstream of the first set of cylinders, the first intake throttle being configured to provide air at a first flow rate to the first set of cylinders so as to produce a combustible lean air/fuel mixture in the first set of cylinders.

16. The system of claim 10, further comprising:
a second intake throttle positioned upstream of the second set of cylinders and in parallel thereto, the second intake throttle being configured to provide air at a second flow rate to the second set of cylinders so as to produce a combustible rich air/fuel mixture in the second set of cylinders.

17. The system of claim 10, further comprising:
an oxidation catalyst positioned downstream of the first set of cylinders and upstream of the selective catalytic reduction system, the oxidation catalyst configured to reduce carbon monoxide and hydrocarbons included in the exhaust gas first portion, the oxidation catalyst further configured to convert a portion of the NO in the exhaust gas first portion to $NO_2$, the exhaust gas second portion bypassing the oxidation catalyst.

18. A method of operating an engine including a plurality of cylinders, the method comprising:
providing a lean air/fuel mixture to a first set of cylinders of the plurality of cylinders;
operating the first set of cylinders at a first compression ratio;
providing a rich air/fuel mixture to a second set of cylinders of the plurality of cylinders;
operating the second set of cylinders at a second compression ratio less than the first compression ratio;
communicating an exhaust gas second portion produced by the second set of cylinders through an ammonia generating catalyst of an aftertreatment system;
communicating the exhaust gas second portion through at least one downstream aftertreatment component of the aftertreatment system; and
communicating an exhaust gas first portion produced by the first set of cylinders through the at least one downstream aftertreatment component, the exhaust gas first portion bypassing the ammonia generating catalyst.

19. The method of claim 18, wherein the lean air/fuel mixture has a first equivalence ratio, the first equivalence ratio having an upper limit determined by NOx emissions from the lean air/fuel mixture, and wherein the rich air/fuel mixture has a second equivalence ratio, the second equivalence ratio in the range of 1.0 to 1.1.

20. The method of claim 18, wherein the first compression ratio is configured so as to provide a high brake thermal efficiency of the first set of cylinders operating on the lean air/fuel mixture.

21. The method of claim 20, wherein the second compression ratio is configured so as to allow optimal combustion phasing of the rich air/fuel mixture used in the second set of cylinders while avoiding uncontrolled auto-ignition.

22. A system, comprising:
an engine comprising a plurality of cylinders including a first set of cylinders and a second set of cylinders;
a first intake throttle positioned upstream of the first set of cylinders, the first set of cylinders configured to be operated at a first compression ratio, the first compression ratio configured so as to provide a high brake thermal efficiency of the first set of cylinders operating on a lean air/fuel mixture;
a second intake throttle positioned upstream of the second set of cylinders, the second set of cylinders configured to be operated at a second compression ratio less than the first compression ratio, the second compression ratio configured so as to allow optimal combustion phasing of a rich air/fuel mixture used in the second set of cylinders while avoiding uncontrolled auto-ignition;
an ammonia generating catalyst positioned downstream of the second set of cylinders; and
a controller communicatively coupled to each of the first intake throttle, and the second intake throttle, the controller including:
a first intake throttle circuitry configured to instruct the first intake throttle to provide air at a first flow rate into the first set of cylinders, the first air flow rate producing the lean air/fuel mixture in the first set of cylinders,
a second intake throttle circuitry configured to instruct the second intake throttle to provide an air at a second flow rate into the second set of cylinders, the second flow rate producing the rich air/fuel mixture in the second set of cylinders,
an ammonia determining circuitry configured to determine the molar flow rate of ammonia produced by the ammonia generating catalyst,
a NOx determining circuitry configured to determine the NOx molar flow rate produced by the first set of cylinders, and
a NOx/ammonia ratio controlling circuitry configured to control the NOx molar flow rate in the first set of cylinders and an ammonia molar flow rate in the second set of cylinders such that the ratio of NOx to ammonia is 1.

23. The system of claim 22, wherein a first set of fuel metering devices and a first set of fuel ignition devices are operatively coupled to the first set of cylinders, and a second set of fuel metering devices and a second set of fuel ignition devices are operatively coupled to the second set of cylinders, wherein the controller further comprises:
a fuel metering circuitry configured to instruct the first set of fuel metering devices to insert fuel into the first set of cylinders so as to produce a lean air/fuel mixture therein, the fuel metering circuitry further configured to instruct the second set of fuel metering devices to insert fuel into the second set of cylinders so as to produce a rich air/fuel mixture therein; and
a fuel ignition circuitry configured to instruct the first set of fuel ignition devices to ignite the lean air/fuel mixture in the first set of cylinders and instruct the second set of fuel ignition devices to ignite the rich air/fuel mixture in the second set of cylinders so that the ratio of the molar flow rate of the NOx gases from the first set of cylinders to the molar flow rate of the ammonia from the ammonia generating catalyst is 1.

24. The system of claim 22, wherein the controller further comprises:

an equivalence ratio determining circuitry configured to determine at least one of a first equivalence ratio of the first set of cylinders and a second equivalence ratio of the second set of cylinders.

25. The system of claim 24, wherein the NOx/ammonia ratio controlling circuitry is further configured to control at least one of the first equivalence ratio of the first set of cylinders so as to limit the first equivalence ratio to a maximum level in the first set of cylinders, and to control the second equivalence ratio of the second set of cylinders to limit the equivalence ratio in a stoichiometric to rich range at all times for the second set of cylinders.

26. A controller for operating an engine including a plurality of cylinders, the controller being programmed to perform steps comprising:

causing a lean air/fuel mixture to be provided to a first set of cylinders of the plurality of cylinders;

causing the first set of cylinders to be operated at a first compression ratio;

causing a rich air/fuel mixture to be provided to a second set of cylinders of the plurality of cylinders;

causing the second set of cylinders to operate at a second compression ratio less than the first compression ratio;

causing an exhaust gas second portion produced by the second set of cylinders to be communicated through an ammonia generating catalyst of an aftertreatment system;

causing the exhaust gas second portion to be communicated through at least one downstream aftertreatment component of the aftertreatment system; and causing an exhaust gas first portion produced by the first set of cylinders to be communicated through the at least one downstream aftertreatment component, the exhaust gas first portion bypassing the ammonia generating catalyst.

* * * * *